US011816134B1

(12) United States Patent
Ezrielev et al.

(10) Patent No.: US 11,816,134 B1
(45) Date of Patent: Nov. 14, 2023

(54) SYSTEM AND METHOD FOR REDUCTION OF DATA TRANSMISSION IN DYNAMIC SYSTEMS USING CAUSAL GRAPHS

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 17/850,615

(22) Filed: Jun. 27, 2022

(51) Int. Cl.
*G06F 16/28* (2019.01)
*G06N 5/04* (2023.01)
*G06F 16/2455* (2019.01)
*G06F 16/27* (2019.01)

(52) U.S. Cl.
CPC ...... *G06F 16/288* (2019.01); *G06F 16/24556* (2019.01); *G06F 16/27* (2019.01); *G06F 16/273* (2019.01); *G06F 16/275* (2019.01); *G06F 16/278* (2019.01); *G06N 5/04* (2013.01)

(58) Field of Classification Search
CPC .. G06F 16/288; G06F 16/27; G06F 16/24556; G06F 16/273; G06F 16/275; G06F 16/278; G06N 5/04
See application file for complete search history.

(56) References Cited

U.S. PATENT DOCUMENTS

| | | | |
|---|---|---|---|
| 2012/0116850 A1* | 5/2012 | Abe .............. | G06Q 10/067 705/7.38 |
| 2015/0095136 A1* | 4/2015 | Jalali .............. | G06N 3/043 705/14.41 |
| 2020/0134420 A1* | 4/2020 | Spooner ........... | H04W 4/02 |
| 2020/0159961 A1* | 5/2020 | Smith .............. | G06F 18/213 |

OTHER PUBLICATIONS

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

(Continued)

*Primary Examiner* — Kris E Mackes
*Assistant Examiner* — Lin Lin M Htay
(74) *Attorney, Agent, or Firm* — Womble Bond Dickinson (US) LLP

(57) ABSTRACT

Methods and systems for managing data collection in a distributed system are disclosed. The system may include a data aggregator and a data collector. The data aggregator may aggregate data collected by the data collector. To reduce the computing resources used to aggregate data, the data aggregator and data collector may implement a multi-stage data reduction processes to reduce the quantity of data transmitted for data aggregation purposes. The multi-stage data reduction process may include implementing twin inference models at the aggregator and collector, identifying relationships in the data collected by the data collector, transmitting a portion of the collected data to the data aggregator based on acceptable level of error for use of the (Continued)

collected data, and reconstructing the un-transmitted portion of the collected data at the aggregator. The reconstructed portion of the collected data may include the acceptable level of error.

20 Claims, 9 Drawing Sheets

(56) References Cited

OTHER PUBLICATIONS

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting node similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).

A. Vaswani, N. Shazeer, N. Parmar, J. Uszkoreit, L. Jones, A. Gomez, L. Kaiser, and I. Polosukhin, "Attention Is All You Need", 31st Conference on Neural Information Processing Systems (NIPS 2017), Long Beach, CA, USA, pp. 1-15.

B. Lu, J. Yang, L. Chen, and S. Ren, "Automating Deep Neural Network Model Selection for Edge Inference", 2019 IEEE First International Conference on Cognitive Machine Intelligence (CogMI), 2019, pp. 184-193.

K. Singh, A. Verma, and L. Vig, "Deep Learning Based Network Similarity for Model Selection", Data Science 4, 2021, pp. 63-83, DOI 10.3233/DS-210033, IOS Press.

A. Krause, R. Rajagopal, A. Gupta, and C. Guestrin, "Simultaneous Placement and Scheduling of Sensors", Carnegie Mellon University, School of Computer Science, Machine Learning Department, Pittsburgh, PA, CMU-ML-08-114, Oct. 2008, pp. 1-28.

Pearl, Judea. "Causal inference in statistics: An overview." Statistics surveys 3 (2009): 96-146. https://projecteuclid.org/journals/statistics-surveys/volume-3/issue-none/Causal-interference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

* cited by examiner

SYSTEM AND METHOD FOR REDUCTION OF DATA TRANSMISSION IN DYNAMIC SYSTEMS USING CAUSAL GRAPHS

FIELD

Embodiments disclosed herein relate generally to data collection. More particularly, embodiments disclosed herein relate to systems and methods to limit resource consumption for the transmission of data during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
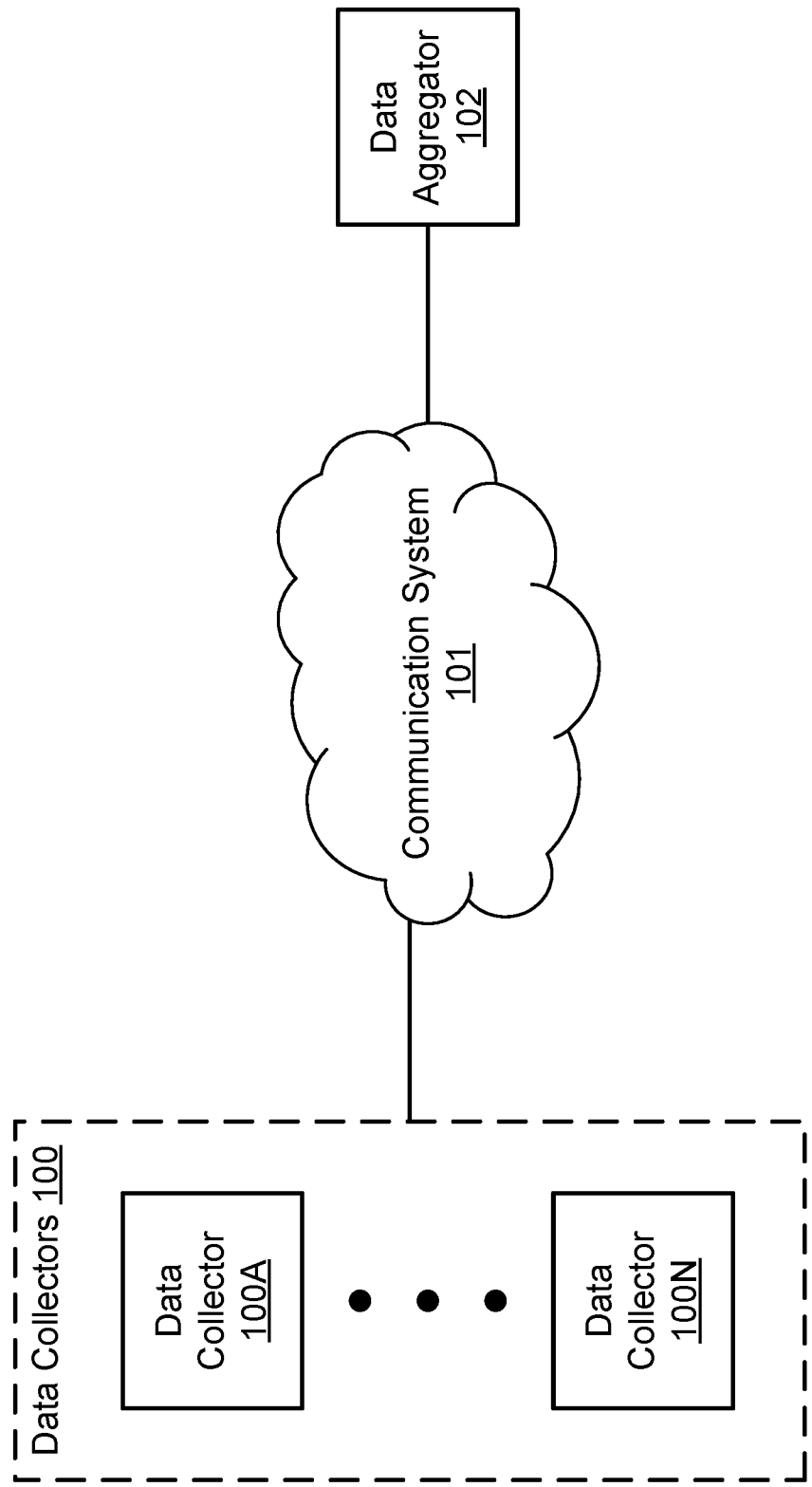
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed system. To manage data collection, the system may include a data aggregator and a data collector. The data aggregator may aggregate data collected by the data collector. Aggregating the data at the data aggregator may consume computing resources due to, for example, transmission of the data across the distributed system.

To reduce the computing resources used to aggregate data, the data aggregator and data collector may implement a multi-stage data reduction processes to reduce the quantity of data transmitted for data aggregation purposes. The multi-stage data reduction process may include implementing twin inference models at the aggregator and collector, identifying relationships in the data collected by the data collector, transmitting a portion of the collected data to the data aggregator based on acceptable level of error for use of the collected data, and reconstructing the un-transmitted portion of the collected data at the aggregator. The reconstructed portion of the collected data may include the acceptable level of error.

The data aggregator may then use the aggregated for various processes, such as, for example, manufacturing management, system monitoring, etc. By doing so, embodiments disclosed herein may provide a distributed system that is able to obtain data aggregated from sources across a distributed system at a reduced computing resource cost.

Thus, embodiments disclosed herein may address the technical problem of computing resource cost for data aggregation. The disclosed embodiments may do so by aggregating data without requiring that all of the aggregated data be sent to an aggregation location. Consequently, the load on the distributed system for aggregating data may be reduced. Accordingly, a distributed system in accordance with embodiments disclosed herein have more available computing resources for performing other tasks when compared with systems that do not implemented the disclosed embodiments.

For system components that may be resource constrained, such as edge nodes, autonomous vehicles, etc., the improved availability of computing resources may enable these components to provide their other functions. Example embodiments are discussed below.

In an embodiment, a method for managing data collection in a distributed system where data is collected in a data aggregator of the distributed system and from a data collector of the distributed system that is operably connected to the data aggregator via a communication system is provided. The method may include obtaining, by the data aggregator, a data set for the data collector; obtaining, by the data aggregator and using the data set, a feature relationship model comprising causal relationships between features of the data set; selecting, by the data aggregator and using the feature relationship model, a data reduction plan based on acceptable error thresholds associated with the features; configuring, by the data aggregator, the data collector to send reduced size data based on the data reduction plan; obtaining, by the data aggregator, reduced size data from the configured data collector; and reconstructing, by the data aggregator, data upon which the reduced size data is based using the feature relationship model.

The feature relationship model may include a causal graph. The causal graph may include nodes corresponding to the features of the data set and edges interconnecting the nodes. The edges may indicate the causal relationships, the causal relationships indicating how different features of the features may be obtained using other features of the features.

The data reduction plan may indicate a first subset of the features that are to be indicated by the reduced size data and a second subset of the features that are not to be indicated by the reduced size data; a quantization level for the first subset of the features; and a window duration that defines when the reduced size data is to be provided by the configured data collector to the data aggregator.

The reduced size data may include representations of the first set of the features for a period of time defined by the window duration, the representations excluding portions of respective features based on a corresponding acceptable error threshold of the acceptable error thresholds.

The method may also include providing the configured data collector with a copy of the feature relationship model; and initiating refinement of the data reduction plan by the configured data collector using the feature relationship model and measurements obtained by the configured data collector during the window duration, at least one of the representations represents a feature of the second subset of the features. The data reduction plan may be refined sequentially for data corresponding to respective window durations. The data reduction plan may be obtained using a genetic algorithm and an objective function based on: quantization of features of the data set; predictability of the feature of the data set with the feature relationship model; reconstructability of the features of the data set using twin inference models hosted by the configured data collector and the configured data aggregator; and computing resource costs for transmitting the features of the data set from the configured data collector to the data aggregator.

The configured data collector may be intermittently operably connected to the data aggregator by the communication system.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed system.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed system.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data, and/or provide the aggregated data to other entities that may use the data for similar and/or different purposes. In an industrial environment, for example, data aggregator 102 may decide when to open and/or close valves using the aggregated data. Data aggregator 102 may be utilized in other types of environments and to make other types of control decisions (or other types of decisions entirely, or use the data for other purposes) without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different data collectors may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100. However, in some cases, it may be desirable to increase the volume of data transmissions in order to increase the accuracy of the aggregated data for consumption by downstream applications, to more fully characterize processes, and/or for other purposes. To manage the process of data aggregation for different purposes, data aggregator 102 and/or data collectors 100 may dynamically adapt the operation of the system of FIG. 1 in order to prioritize data accuracy, data transmission reduction, energy consumption efficiency, and/or other considerations (and/or to meet other goals).

In general, embodiments disclosed herein may provide methods, systems, and/or devices for managing data collection in a distributed system. To manage data collection in a distributed system, a system in accordance with an embodiment may limit the transmission of data between components of the system while ensuring that all components that need access to the data to provide their respective functions are likely to have access to accurate data. By limiting the transmission of data, communication bandwidth of the system of FIG. 1 may be preserved, energy consumption for data transmission may be reduced, etc.

To limit the transmission of data, data aggregator 102 may (i) select some of the data collected by data collectors 100 to not be sent to it, (ii) implement a twin inference model system for data size reduction via communication system 101, and (iii) reconstruct data that is not sent to it and/or the data that is size reduced. By doing so, data aggregator 102 may obtain an aggregation of data that is collected by data collectors 100 without needing to have copies of all of the data from the data collectors 100 sent to it or otherwise communicated.

To select some of the data collected by data collectors 100, data aggregator may obtain a feature relationship model. The feature relationship model may establish relationships between various features in collected data. These relationships may be used to reconstruct portions of collected data that are not transmitted between a data collector and data aggregator 102. The selected data collected by data collectors 100 may be the portions of collected data that may be reconstructed (within limits, discussed below) using other portions of the collected data.

In an embodiment, the feature relationship model is implemented using a causality graph. A causality graph may be implemented using a data structure including nodes and edges. The nodes may represent various features in collected data, and the edges may reflect the relationships between the nodes. The causality graph may be obtained via a computer automated construction process, may be read from a repository or other data structure, may be established by a subject matter expert, and/or may be obtained via other methods without departing from embodiments disclosed herein. Any number of causality graphs may be obtained and used with respect to any number of data collectors 100 for data transmission reduction purposes without departing from embodiments disclosed herein.

In an embodiment, the causality graph is obtained using a training data set (e.g., some quantity of collected data). However, the causality graph may become inaccurate if data collected by a data collector begins to drift from the training data set. To reduce the impact of data drift, the causality graph may be provided to the data collector. Rather than continuing to use information regarding which portions of collected data (e.g., features in collected data) that are not to be provided to data aggregator 102, the data collector (e.g., initiated by the aggregator through providing of the causality graph) may review its collected data and evaluate whether the information regarding which portions of collected data to not provide to data aggregator 102 should continue to be used, or updated using the causality graph (or may initiate updating, by the data aggregator, of the selected data that is not transmitted). In the event that the causality graph becomes inaccurate, the causality graph hosted by the data collector and/or data aggregator may be updated.

To select the portion of the collected data (not provided to the aggregator) using the causality graph (by the aggregator and/or data collectors), limits on a difference between the collected data and the aggregator's representation of the collected data (which may include a first portion of data that is predicted, a second portion of data that is reconstructed using the causality graph, a third portion of data that is reconstructed based on reduced size representations that are transmitted between the data collector and the data aggregator and predictions generated by the data aggregator 102, and fourth portion of data that is transmitted between the data collector and the data aggregator) may be taken into account. For example, certain limits on the difference between the aggregator's representation of the collected data and the collected data may be imposed by downstream consumers (e.g., applications, other devices) of the aggregated data. These limits may reflect differences between each corresponding portion (e.g., a single measurement), or groups of portions (e.g., a limit on the aggregate difference over a period of time or another group of portions) such as measurements made over a time period.

The portion of the collected data (that is not transmitted to the aggregator) may be selected to reduce the consumption of computing resources (e.g., energy expenditures, processor cycles, memory, communication bandwidth, etc.) for the aggregator to obtain its representation of the collected data while staying within the limits imposed on the aggregator's representation of the collected data by the downstream consumers. In an embodiment, the selection process is performed by a greedy analysis that attempts to maximize the difference between the aggregator's representation of the collected data while staying within the limits imposed by downstream consumers (or other limits). In an embodiment, the selection process is performed with a balanced analysis that attempts to balance the cost of aggregating the data in data aggregator 102 against the level of difference between the aggregator's representation of the collected data and the data collected by a data collector.

The portion of the collected data may be selected in conjunction with other metrics such as (i) a frequency at which the data collector provides data to the data aggregator, and (ii) a quantization level of the selected portion of the collected data. Each of these metrics (and in conjunction with the selected portion of the collected data not transmitted to the data aggregator being referred to as a "data reduction plan") may each also contribute to difference between the aggregator's representation of the collected data and the data collected by a data collector.

The selection process may be performed, for example, using an objective function that defines a numerical score for data collection plans that have difference metrics (e.g., different portions of the collected data, different collection frequencies which may be defined with window durations, different quantization levels, etc.) but that all fall within the imposed limits on the allowable difference between the aggregator's representation of the collected data and the data collected by a data collector (e.g., the difference between referred to as an "error level"). The objective function may take into account the error level for a data collection plan and the computing resource costs for transmitting data between the data collector and the data aggregator under the data collection plan.

The selection may be made by optimizing the objective function (which may have a best value) via any method. For example, a genetic algorithm, stochastic optimization, random walks, and/or other methods may be used to optimize the objective function. The data collection plan with the best value may be selected.

Once selected, the data collector may be configured with the data reduction plan. Once configured, the data collector may implement the data reduction plan (e.g., quantization levels of collected data, window durations during which data is collected and then transmitted to the data aggregator, and the selected portions of the collected data that are transmitted and the other portions that are not transmitted to the aggregator), and/or revise the data reduction plan if the data that it collects drifts over time.

To implement the twin inference model system, data aggregator 102 may generate and distribute inference models to one or more of the data collectors. Data aggregator 102 may attempt to predict data that may be obtained by data collectors 100 thereby reducing the need for data collected by the data collectors 100 to be transmitted to data aggregator 102 (e.g., the predictions may be used rather than obtained data, or sized reduced data representations such as differences between collected data and predictions of the collected data which may be used by the aggregator to reconstruct the collected data using a similar prediction that it generated). The representations may be implemented as statistics (e.g., statistical information regarding a portion of data obtained by a data collector), as differences (e.g., between data obtained by a data collector and a prediction for the collected data which may be generated locally or remotely), and/or other representations. In the case of differences, twin prediction models at data aggregator 102 and a collector may facilitate reconstruction of the data (or approximate reconstruction, with some error) at the aggregator with transmission of the difference (e.g., which may be highly compressible and/or otherwise require less data to represent). Transmission of portions or representations of collected data may allow data aggregator 102 to provide its functionality (e.g., which may not require perfectly accurate data of that collected by data collectors 100) without needed to transmit the collected data.

To generate the predictions, data aggregator 102 and data collectors 100 may use inference models (copies of a same model hosted on both devices that generate the same predictions for collected data being referred to as "twin inference models"). The inference models may be implemented with, for example, trained machine learning models. The trained machine learning models may not be perfectly accurate and may also provide indications regarding the likely accuracies (e.g., referred to as uncertainties) of the predictions that are generated using the inference models. However, collected data may not always be reconstructable using twin inference models if it is not predictable, or may include significant error. If the error level exceeds the acceptable accuracy levels of downstream consumers of the collected data, the corresponding features may be treated as having poor reconstructability. The reconstructability may be quantified based on the level of error in the reconstructions using inferences from the twin inference models.

When data (which may be a reduced size representation) is transmitted to data aggregator 102 from a data collector, data aggregator 102 may (i) reconstruct a first portion of the collected data using the feature relationship model (e.g., which may define the other data in terms of the received data) and/or (ii) reconstruct a second portion of the collected data using corresponding inferences. For example, to reconstruct the first portion (e.g., a temperature at time=5), a function or other numerical relationship (e.g., the temperature at time=5 is double a material flow rate at time=5) from the feature relationship model may be used to compute (e.g., if flow rate at time 5 is 2.2, then the temperature at time 5 is 4.4) the first portion (e.g., temperature at time 5 is 4.4) based on some of the received data (e.g., flow rate at time 5 is 2.2; no explicit temperature data received). Likewise, the second portion may be reconstructed using other portions of the received data and corresponding inferences. For example, the other portions may define differences between inferences available to both the data collector and the data aggregator and the collected data. The received differences (e.g., a value of 0.5) and corresponding inferences (e.g., a value of 1.3) produced using the twin inference model of the data aggregator may be used to compute the second portion (e.g., 0.5+1.3=1.8) of the reconstructed data.

The resulting representation of the collected data at data aggregator 102 may include (i) a portion of inferences for the collected data, (ii) a portion of reconstructed collected data obtained with inferences and reduced size representation of the collected data provided by the data collector and/or transmitted collected data (e.g., when twin inference models generate inaccurate predictions), and/or (iii) a portion of reconstructed data obtained with the feature relationship model (which may include a relationship that takes, as input, some inference, reconstructed collected data, and/or transmitted collected data). Thus, the data aggregator's representation of the collected data may include a significant quantity of data that is never provided by the data collectors, but that is similar to the collected within a predetermined degree of error. By doing so, data aggregator 102 may aggregate data at reduced computing resource cost when compared to aggregating data by sending copies of the data.

When performing its functionality, data aggregator 102 may perform all, or a portion, of the methods and/or actions shown in FIGS. 3A-4D.

Data collectors 100 may (i) collect data and (ii) implement data reduction plans to allow data aggregator 102 to aggregate the collected data. Data collectors 100 may also, as noted above, refine data reduction plans to adjust to shifts in the character of the collected data. When doing so, any of data collectors 100 may utilize feature relationship models and acceptable error levels (e.g., thresholds) to select the portions of the collected data to provide to data aggregator 102 and other portions of the collected data to withhold from data aggregator 102 but that may be reconstructed by data aggregator 102 using the feature relationship models.

When performing its functionality, data collectors 100 may perform all, or a portion, of the methods and/or actions shown in FIGS. 3A-4D.

Any of data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

In an embodiment, one or more of data collectors 100 are implemented using resource limited devices such as autonomous vehicles (e.g., drones, nanobots, etc.). These devices may have both computational and power limits thereby limiting the quantity of data that the devices may communicate.

In an embodiment, one or more of data collectors 100 are implemented using computing devices that have limited connectivity to data aggregator 102. For example, data collectors 100 may be air-gapped to data aggregator during periods of time (e.g., intentionally such as in an air-gapped computing environment, or unintentionally when subject to limited connectivity due to lack of transmission access mediums such as wireless networks).

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol). In an embodiment, communication system 101 is intermittent (e.g., such as a wireless network which only covers certain regions into and out of which data collectors move) and/or includes periods in which the operable connections are interrupted intentionally (e.g., intentional air-gapping) or unintentionally.

While illustrated in FIG. 1 as included a limited number of specific components, a system in accordance with an embodiment may include fewer, additional, and/or different components than those illustrated therein.

Figure 2:
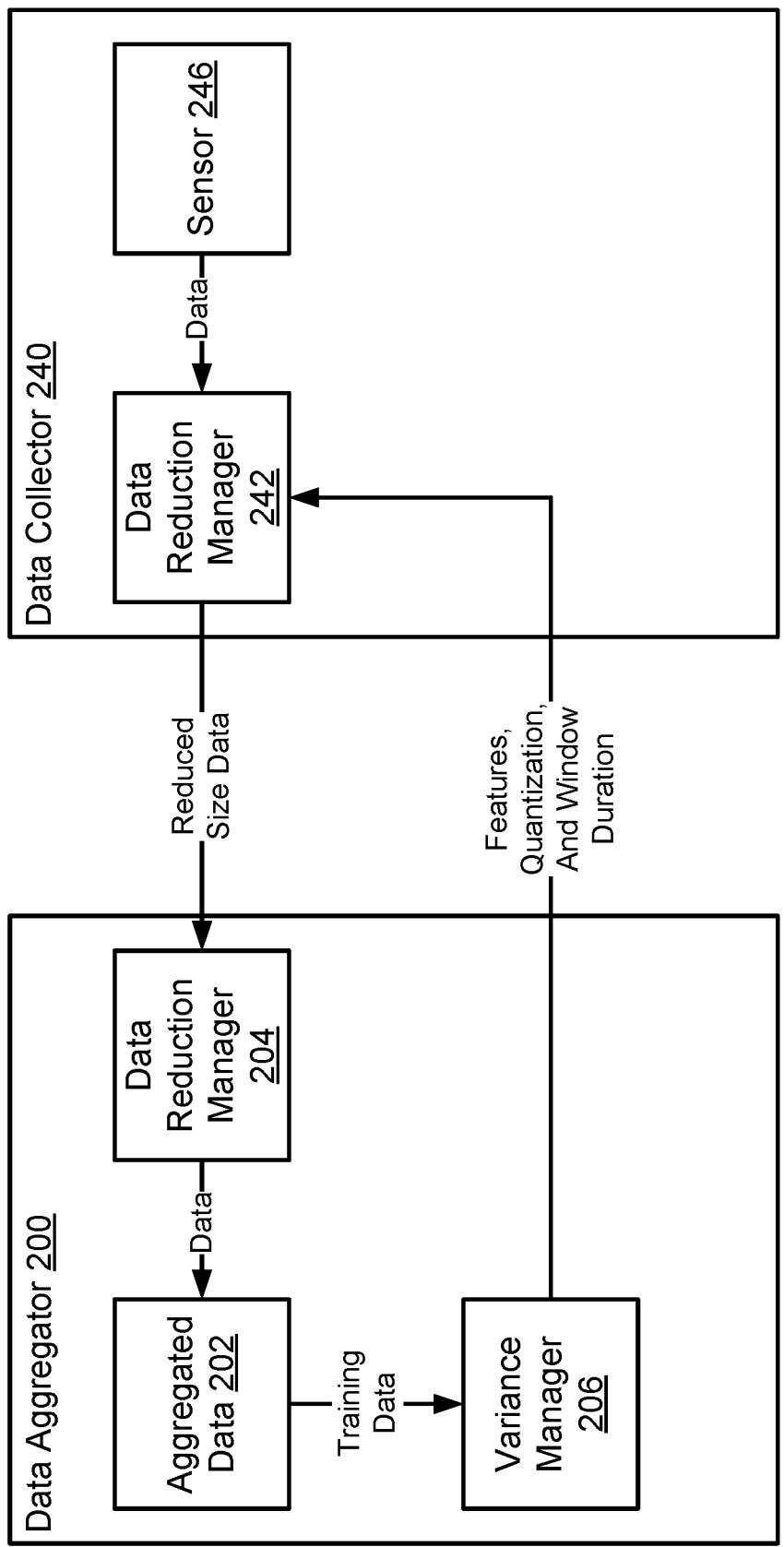
FIG. 2 shows a block diagram illustrating a data aggregator in accordance with an embodiment.

Turning to FIG. 2, a diagram of data aggregator 200 and data collector 240 in accordance with an embodiment is shown. Data aggregator 200 may be similar to data aggregator 102, and data collector 240 may be similar to any of data collectors 100. In FIG. 2, data aggregator 200 and data collector 240 are connected to each other via a communication system (not shown). Communications between data aggregator 200 and data collector 240 are illustrated using lines terminating in arrows.

As discussed above, data aggregator 200 may obtain aggregated data 202 (while shown with respect to a single data collector, aggregated data 202 may include data from multiple data collectors). Aggregated data 202 may include data obtained from data collector 240, predictions of data collected by data collector 240 that is not obtained by data aggregator 200, and reconstruction of data collected by data collectors 240 that is not obtained by data aggregator 200. Downstream consumers (e.g., applications) may utilize aggregated data 202 to provide any type and quantity of services.

To obtain aggregated data 202, data aggregator 200 may host a data reduction manager 204. Data collector 240 may host a complementary data reduction manager 242. These data reduction managers 204, 242 may facilitate data collection in a manner that reduces the quantity of data transmitted between data aggregator 200 and data collector 240. For example, data reduction manager 242 may (i) transmit reduced size representations of data collected by data collector 240 generated using a twin inference model and/or (ii) selectively transmit data to data aggregator 200.

Data reduction manager 204 may (i) used the reduced size representations to reconstruct (perfectly or imperfectly) the data collected by data collector 240 using its copy of the twin inference model, (ii) use predictions of the data collected by data collector 240 when reduced size representations are not provided by data collector 240 (which may indicate that the predictions are sufficiently accurate), and (iii) use the predictions and/or reconstructed data based on the reduced size data to reconstruct other data not provided by data collector 240 using a feature relationship model. Data reduction manager 204 may store the data (either reconstructed, predictions, and/or actual copies) as aggregated data 202. Aggregated data 202 may be treated by downstream consumers as though it matches the data collected by data collector 240, even though there may be some degree of difference due to the use of inferences and reconstruction in its generation.

Both data reduction managers 204, 242 may coordinate using a data reduction plan. The data reduction plan may be generated by variance manager 206. As noted above, to do so, variance manager 206 may obtain training data to establish a feature relationship model. The feature relationship model and error limits (e.g., from downstream consumers of aggregated data 202) may be used to establish the data reduction plan which may include features (e.g., portions of collected data) of collected data that are not to be provided to data aggregator 200, quantization levels for the information regarding the collected data that is to be provided to data aggregator 200, a window duration during which data collector 240 is to collect data and provide the reduced size data for the data collected at the end (or at some time point with respect to the end) of the window duration, and/or other information regarding how to provide collected data to data aggregator 200.

To provide their functionalities, the data reductions manager 204, 242 may include or use trained inference models, as noted above. The trained inference models may provide inferences (predictions of data collected by data collector 240) which may be used to further reduce the quantity of data transmitted between data collector and data aggregator 200 through data reconstructions. For example, transmitting a binary representation of a difference between an inference and a portion of collected data may be more computationally resource efficient than transmitting the portion of the collected data.

Sensor 246 may obtain information regarding a characteristic of an environment in which data collector 240 is positioned. Sensor 246 may obtain the information using any sensing modality and may be implemented with any type of sensor. Different sensors of data collector 240 may collect similar or different types of information, and may collect any quantity of information. Sensor 246 may encode the information in data, and provide the data to data reduction manager 242. Sensor 246 may be implemented with any type of hardware device for sensing.

In an embodiment, any of data reduction manager 204, variance manager 206, and data reduction manager 242 is implemented using a hardware device including circuitry. The hardware device may be, for example, a digital signal processor, a field programmable gate array, or an application specific integrated circuit. The circuitry may be adapted to cause the hardware device to perform the functionality of data reduction manager 204, variance manager 206, and/or data reduction manager 242. Data reduction manager 204, variance manager 206, and/or data reduction manager 242 may be implemented using other types of hardware devices without departing embodiment disclosed herein.

In one embodiment, any of data reduction manager 204, variance manager 206, and data reduction manager 242 is implemented using a processor adapted to execute computing code stored on a persistent storage that when executed by the processor performs the functionality of data reduction manager 204, variance manager 206, and/or data reduction manager 242 discussed throughout this application. The processor may be a hardware processor including circuitry such as, for example, a central processing unit, a processing core, or a microcontroller. The processor may be other types of hardware devices for processing information without departing embodiment disclosed herein.

While illustrated in FIG. 2 with a limited number of specific components, a data aggregator and/or data collector may include additional, fewer, and/or different components without departing from embodiments disclosed herein.

Figure 3A:
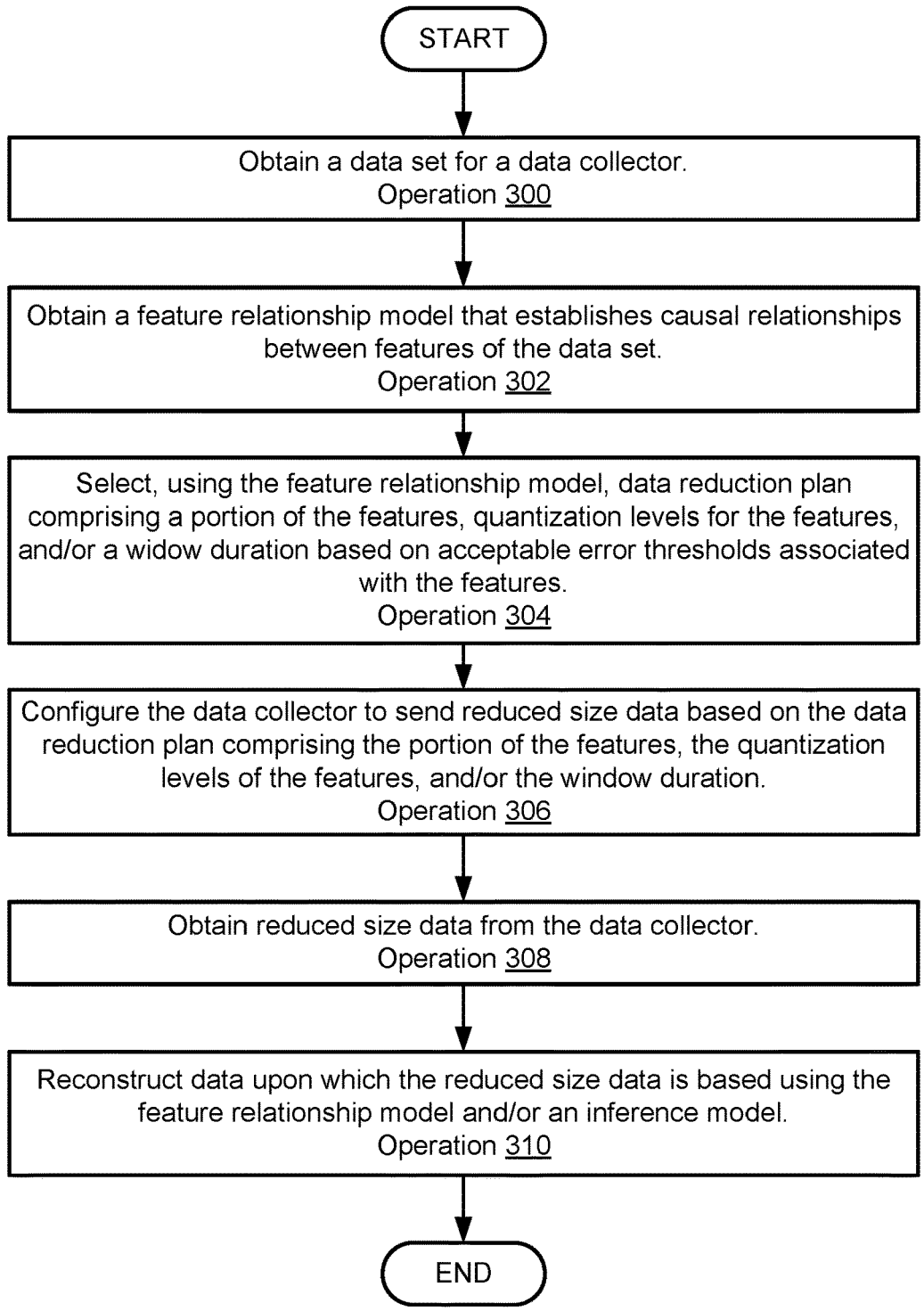
FIG. 3A shows a flow diagram illustrating a method of aggregating data in a distributed system in accordance with an embodiment.
Figure 3B:
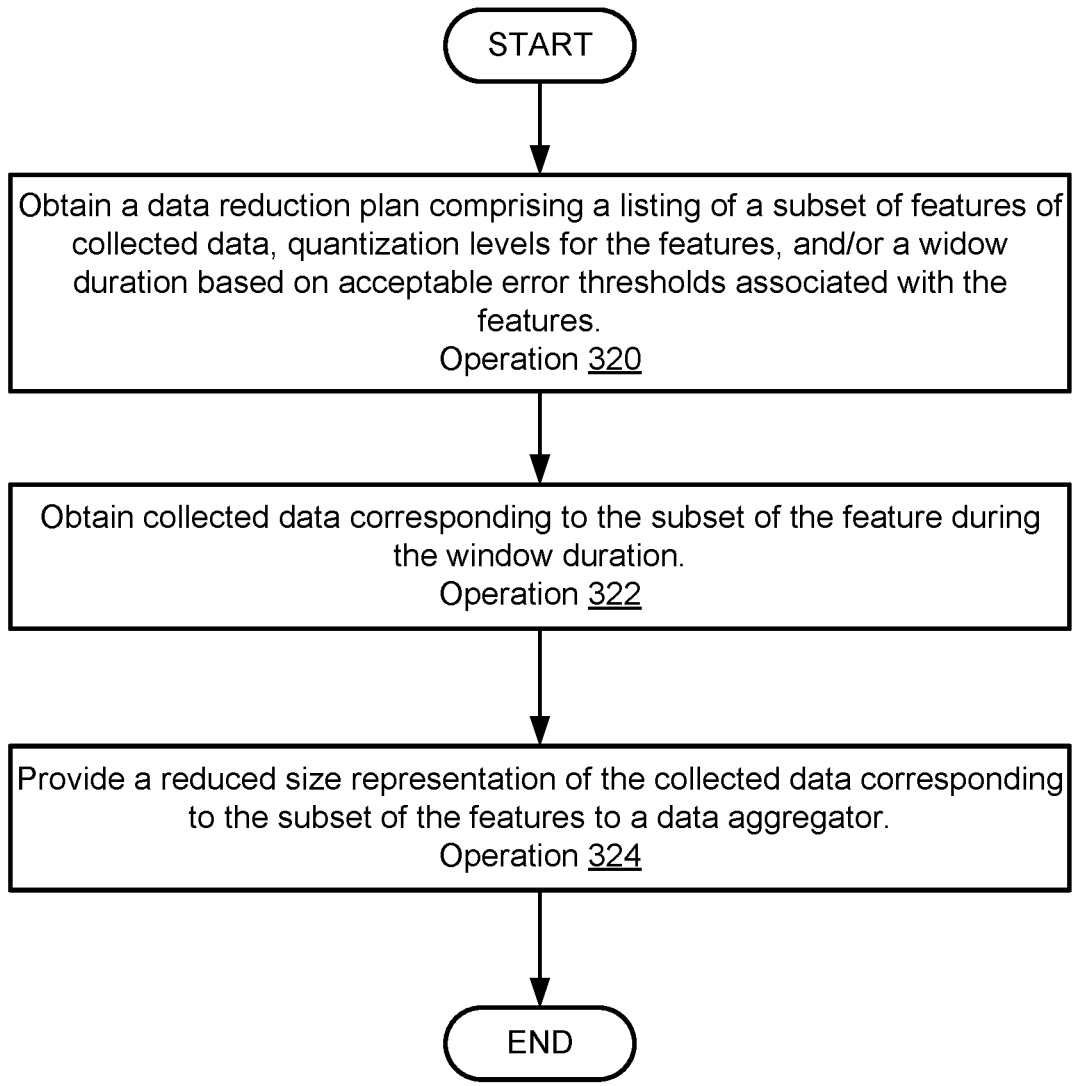
FIG. 3B shows a flow diagram illustrating a method of collecting data in accordance with an embodiment.

As discussed above, the components of FIG. 1 may perform various methods to aggregate data from a distributed system. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of aggregating data in a distributed system in accordance with an embodiment is shown. The method may be performed by a data aggregator and/or data collector.

At operation 300, a data set for a data collector is obtained. The data set may be used as training data for a feature relationship model for the data collector (and/or other data collectors). The data set may be obtained by reading it from stored, receiving it from the data collector, and/or via other methods. The data set may include any number of features. The features may be variation in collected data over a period of time. For example, the features may be implemented with data structure that indicate a value as it changes over time. The value may correspond to a measurement (or other data collection method) made by a data collector over time. The value may reflect any type of information such as, for example, an environmental condition, a condition of the data collector, a condition of another device, etc. The information may be any type of condition such as, for example, temperature, acidity level, power consumption rate, output level, etc.

At operation 302, a feature relationship model is obtained using the data set. The feature relationship may establish causal relationship between features (or portion thereof) of the data set.

In an embodiment, the feature relationship model is obtained by reading it from a repository. The repository may include any number of feature relationship models keyed to various type of training data. The data set may be used as a key to discriminate the feature relationship model from other feature relationship models in the repository.

In an embodiment, the feature relationship model is obtained by generating the feature relationship model. For example, an automated process may explore the data set to establish a feature relationship model. The automated process may be a statistical analysis, regression analysis, or other type of process that may establish a relationship between two portions of different features, or different portions of a same feature. The automated process may establish any number of such relationships.

In an embodiment, the feature relationship model is obtained through analysis by a subject matter expert. The subject matter expert may generate the feature relationship model. The training data may be added to a queue of analysis projects of the subject matter expert and upon completion the completed feature relationship model may be automatically obtained by the data aggregator.

In an embodiment, the feature relationship model comprises a causal graph. The causal graph may include any number of nodes corresponding to features, or portions thereof, of the training data. The edges between the nodes may indicate relationships between the features. For example, an edge between nodes representing a first and second feature may indicate how the second feature is related to the first feature. Thus, if data for the first feature is available, the second feature may be derived using the data for the first feature.

The edge may also indicate (or otherwise may it ascertainable) a level of error introduced when the second feature is derived from data corresponding to the first feature. For example, the edge may specify how to obtain the second feature using a formula (e.g., a regression model in the case of a data series), that includes some error with respect to the second feature. The quantity of error introduced by the derivation process for the second feature may be calculated by comparing the derived values of the second feature to the values of the second feature in the training data.

At operation 304, a data reduction plan is selected based on acceptable error thresholds associated with the features. The data reduction plan may be selected by evaluating different data reduction plans in view of the acceptable error thresholds with respect to a goal. The goal may be defined in terms of an objective function or other method of quantifying a quality of data reduction plan with respect to the acceptable error thresholds and/or considerations. The goal may due to aggressively (e.g., greedily) to select a minimally qualifying data reduction plan (which may reduce computational resource expenditures for data aggregation) or to select a balanced data reduction plan that balances the risk of obtaining inaccurate representations of collected data against the computational cost of transmitting the data (or various portions thereof).

In an embodiment, the data reduction plan is selected using an optimization method, such as genetic optimization, stochastic optimization, random walks, or other types of procedures to evaluate data reduction plans in view of an objective function. The data reduction plan may be selected using other methods without departing from embodiments disclosed herein.

In an embodiment, the data reduction plan comprises a portion of the features of the data set (e.g., that will not be transmitted to the aggregator when subsequently collected by a data collector), quantization levels for the features, and/or a window duration. Each of these characteristics, may, depending on the characteristic selection, increase or decrease a difference between the representation of the collected data that the aggregator obtains and the actual collected data obtained by a data collector, and increase or decrease a computing resources cost for obtaining the representation of the collected data. For example, by increasing the portion of the features of the data set, the quantity of data transmitted to the data aggregator may increase at the cost of increasing difference between the aggregator's representation of the data collector's collected data and the actual collected data due to error being introduced through reconstruction of the additional features using the feature relationship model. The quantization level and window duration may present similar considerations.

For example, consider an objective function that may rate various data reduction plans. The objective function may be greedy and weight reduced computational cost for obtaining the aggregate data as being the most valuable, so long as the error introduced by the data reduction plan does not exceed the error thresholds associated with the features. The function may take, as input, the parameters of the data reduction plan and calculate, as output, a numerical value that ranges from 0 to 1 with higher numbers being better. The function may weight reductions in computational resource cost for the plan highly regardless of error introduced by the plan, except when the error exceeds the error thresholds. When the error thresholds are exceeded, the objective function may indicate that the data reduction plan has a value of zero to indicate the undesirability of the data reduction plan. In this example, the objective function may be used with an algorithm to identify the largest value for the function across the space over which the parameters of the data reduction plan range. Balanced algorithms or other types of algorithms for selecting a data reduction plan may be used without departing from embodiments disclosed herein.

At operation 306, the data collector is configured using the data reduction plan. The data collector may be configured using the data reduction plan by provided the data collector with a copy of the data reduction plan.

The data collector may also be provided with a copy of the feature relationship model, objective function, and/or other information (such as computational resource cost models). The data collector may use the feature relationship model and/or other information provided by the data aggregator to refine the data reduction plan over time. For example, the data collector may, when it obtains data during a window duration, identify whether the value for the data reduction plan in view of the collected data continues to be well evaluated. If it is not well evaluated, then the data collector may refine the data reduction plan by, for example, selecting other features to omit or include in the data provided to data aggregator. Consequently, the data subsequently provided to the data aggregator may include different features from those features indicated to be omitted/included in the data provided to the data aggregator in the data reduction plan. In this manner, the system may automatically take proactive action to reduce error that would otherwise be introduced into aggregated data.

At operation 308, reduced size data is obtained from the data collector. The reduced size data may be obtained by receiving it from the data collector. As noted above, the reduced size data may include only a portion of the collected data, and/or reduced size representations of some of the collected data. The reduced size representations may include, for example, statistical information (e.g., an average) regarding collections of values of a feature, differences between collected data and inference from twin inference models, etc. The aforementioned reduced size data may be received in a compressed form, thereby allowing for additional compressions through use of quantities that are likely to be easily represented with a small number of bits in the compressed form.

At operation 310, the data upon which the reduced size data is based is reconstructed using the feature relationship model and/or an inference model (e.g., a twin inference model. The data may then be stored as part of aggregated data. The resulting stored aggregated data may include, for example, inferences for data never received (but presumed to accurately reflect the data), reconstructions of data using inferences and the reduced size representations, reconstructions of data never received using the feature relationship model (which may facilitate feature derivation using data corresponding to other features), and copies actual collected data received from the data collector.

The aggregated data may be used to perform any number of computer implemented services. For example, the aggregated data may trigger performance of one or more action sets. The actions set may include any number of actions that cause any type and quantity of subsequent processes to be performed.

In an embodiment, the aggregated data is used to manage a process monitored with the data collector. The aggregated data may be used to initiate modifications in the performance of the monitored process. For example, in an industrial environment the modification may be to change a flow rate of a flow controller, activate operation of a motor, etc. The aggregated data may be usable in other processes without departing from embodiments disclosed herein.

The method may end following operation 310.

Using the method illustrated in FIG. 3A, embodiments disclosed herein may improve the computing resource efficiency of data aggregation in a distributed system. By reducing the quantity of data transmitted across the distributed system, the computing resource cost for aggregating data may be reduced.

Turning to FIG. 3B, a flow diagram illustrating a method of obtaining data in a distributed system in accordance with an embodiment is shown. The method may be performed by a data aggregator and/or data collector.

At operation 320, a data reduction plan is obtained. The data reduction plan may be obtained by receiving the data reduction plan from the data aggregator. The data reduction plan may be obtained by refining a data reduction plan in view of collected data.

The data reduction plan may include a listing of a subset of feature of data collected by the data collector (e.g., that are not to be provided to the data aggregator), quantization levels for the features, and/or a window duration. These parameters of the data reduction plan may be based on an acceptable error threshold associated with the features, as discussed above.

To obtain the data reduction plan through refinement, the objective function in view of the collected data may be evaluated and compared to the value of the objective function for the data reduction plan in view of the training data. If the values indicate that the data reduction plan will be less effective than previously believed, then the data reduction plan may be refined through optimization, in a similar manner to that discussed with respect to the data aggregator's process for obtaining a data reduction plan discussed above.

At operation 322, collected data corresponding to the subset of the features of the data reduction plan is obtained during the time window. For example, data may be collected and the data corresponding to the subset of the features may be discarded without being sent to the data aggregator. The data may be collected, for example, by reading a sensor (which may be separate from or a part of the data collector) that provides values corresponding to the subset of the features.

At operation 324, a reduced size representation of the collected data corresponding to the subset of the features is provided to the data aggregator. The reduced size representation may be provided by transmitting the deduced size representation to the data aggregator.

The reduced size representation may be obtained by (i) removing data from the collected data corresponding to the listing of the subset of the features, (ii) removing data from the collected data for which accurate inferences are provided by a twin inference model, and/or (iii) replacing data from the collected data for which inaccurate inferences are provided by the twin inference model with differences between the data and the inferences, statistic characterizations, or other representations. Other portions of data from the collected data may also be removed to obtain the reduced size representation without departing from embodiments disclosed herein.

In an embodiment, the reduced size representations may be obtained by including a sampling of the remaining data (or a portion thereof). The sampling of the remaining data may allow for the aggregator to reconstruct the collected data not included in the sampling.

The method may end following operation 324.

Figure 4A:
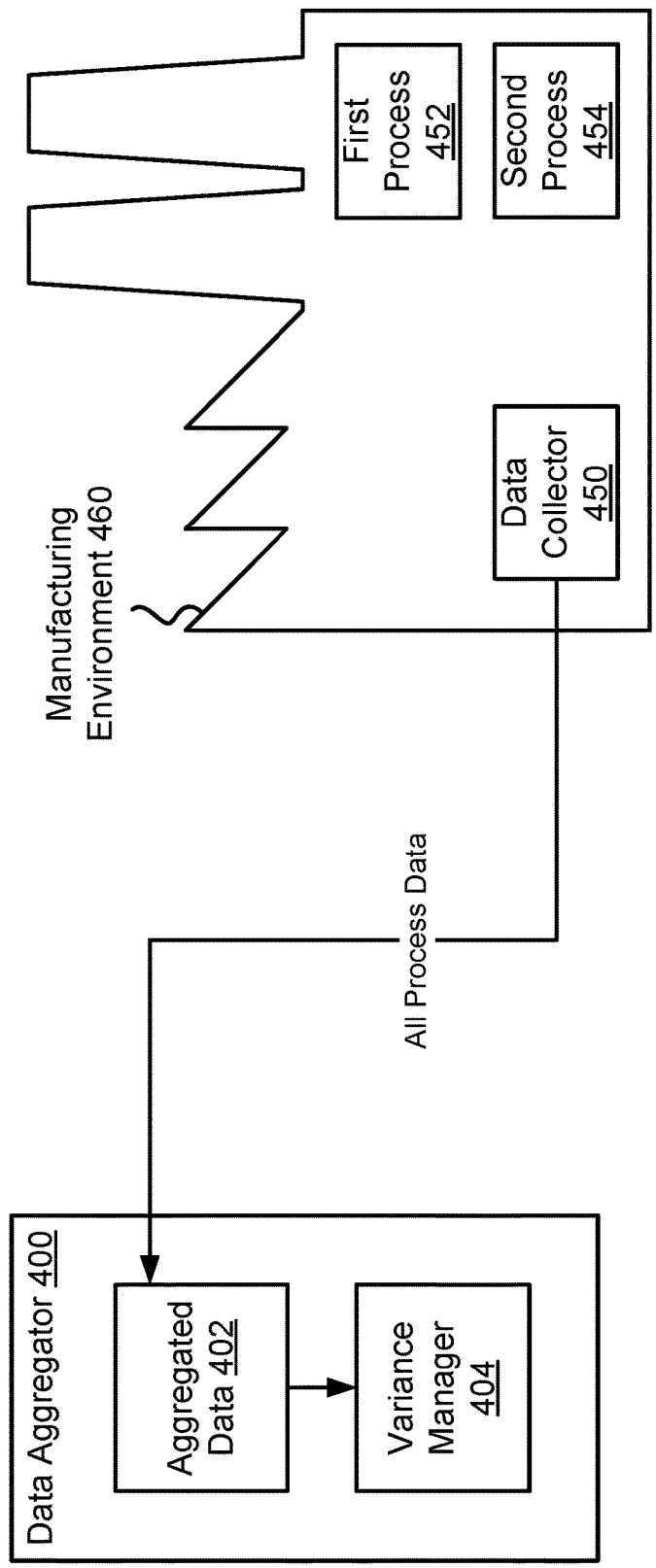
FIGS. 4A-4C show diagrams illustrating a method of managing data aggregation over time in an industrial environment in accordance with an embodiment.
Figure 4B:
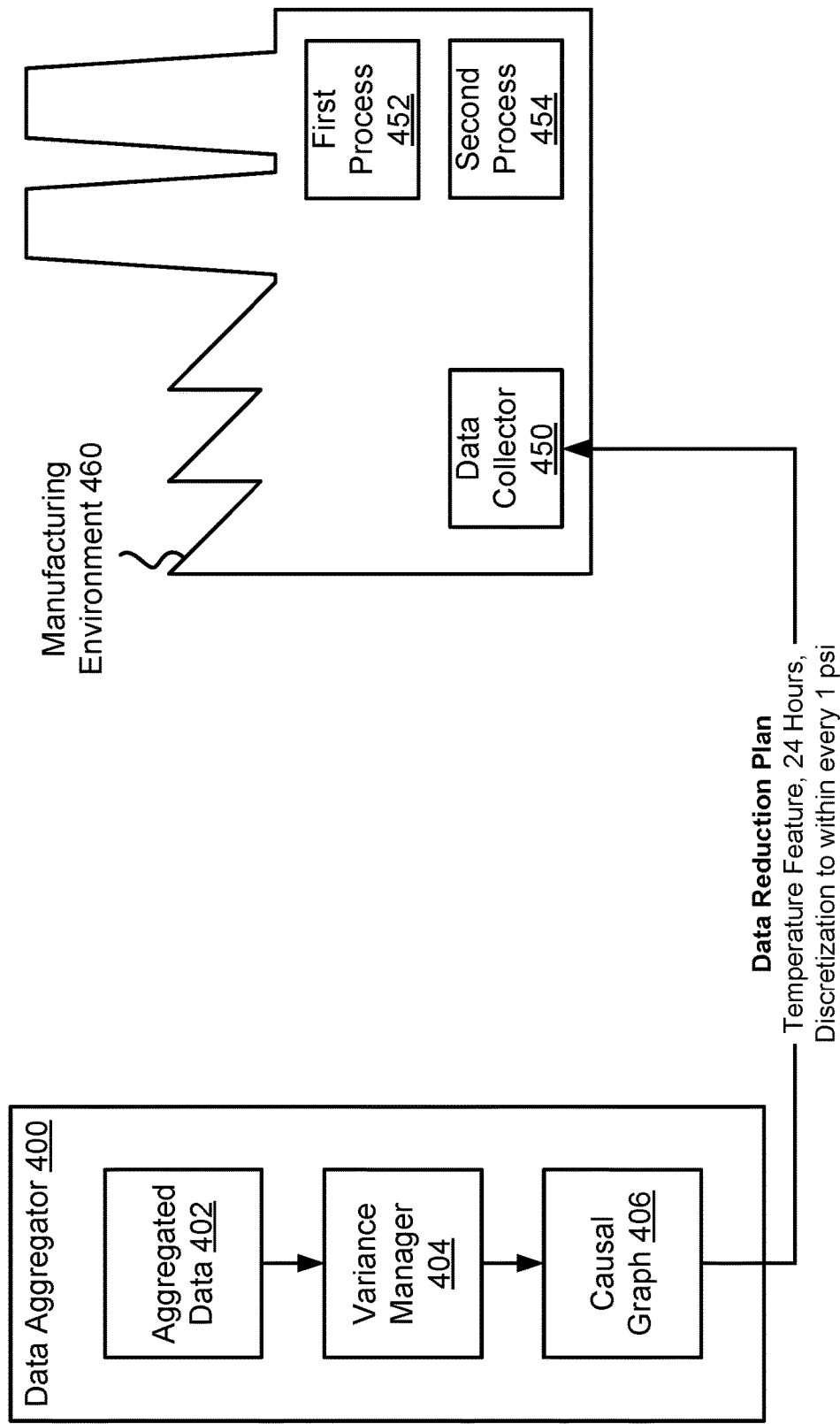
Figure 4C:
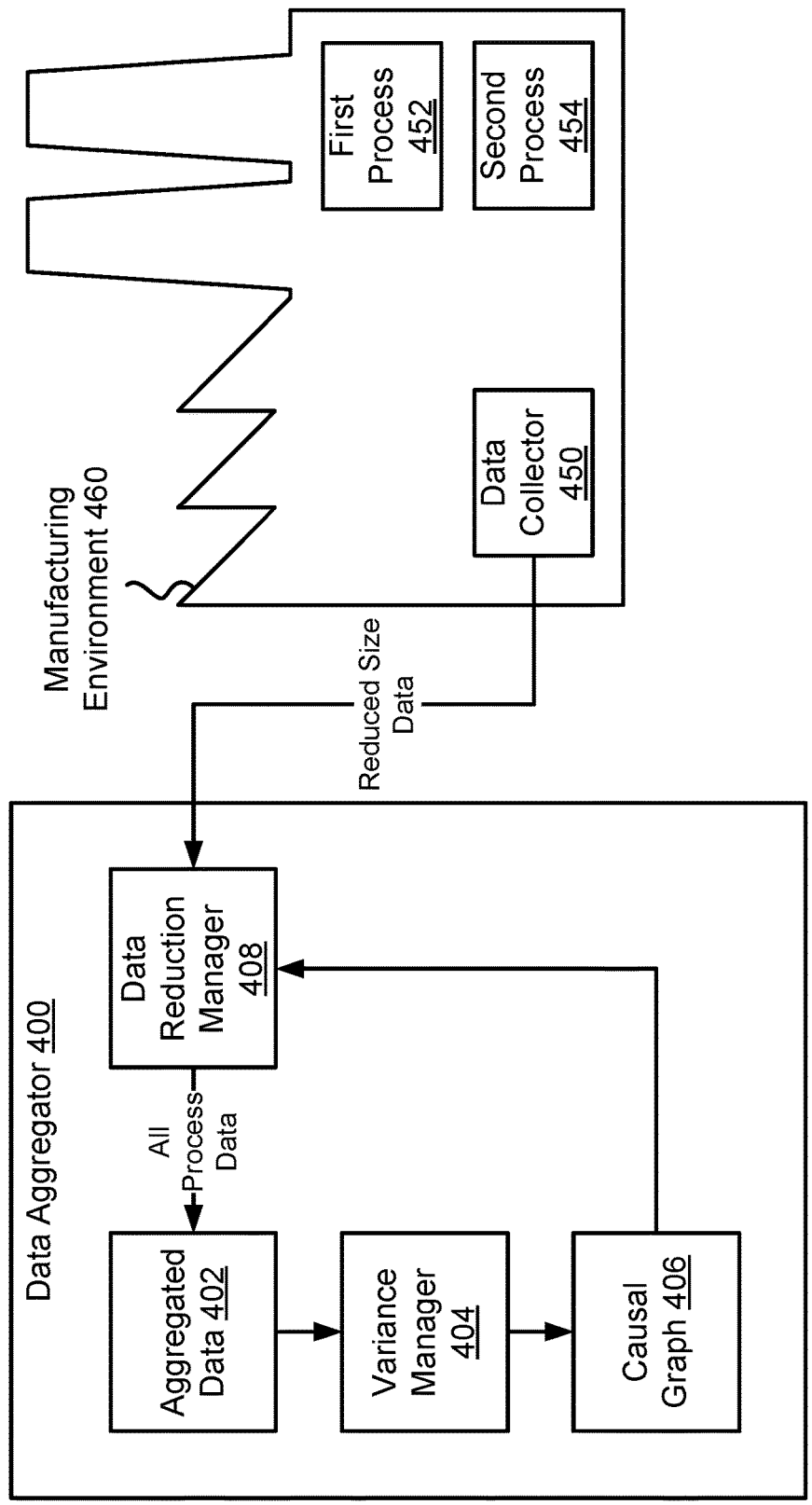

To further clarify embodiments disclosed herein, an example implementation in accordance with an embodiment is shown in FIGS. 4A-4D. These figures show diagrams illustrating a data aggregation process to support a manufacturing environment in accordance with an embodiment are shown. FIGS. 4A-4C may show examples of processes for aggregating data to drive the manufacturing environment in accordance with an embodiment, and FIG. 4D may show examples of a causal graph in accordance with an embodiment.

Turning to FIG. 4A, consider a scenario in which data collector 450 is tasked with collecting data from two processes 452, 454 being performing in a manufacturing environment 460 in which products are manufactured that are constructed through heating a material to a particular level and maintain a level of pressure during the manufacturing process. The material may be somewhat insensitive to temperature, but is sensitive to the level of pressure during the manufacturing process. To monitor the processes, data collector 450 may collect temperature data corresponding to first process 452 and pressure data corresponding to second process 454.

To manage the manufacturing process, data aggregator 400 may be tasked with aggregating data from across manufacturing environment 460, including both the temperature and pressure data. Due to the large quantity of data needed to manage the manufacturing processes, data aggregator 400 implements similar methods, as disclosed herein, to limit the quantity of data transmitted by data collector 450 (and other data collectors, not shown) to data aggregator 400.

To do so, data aggregator 400 initially adds all of the process data (e.g., temperature, pressure) to aggregated data 402. However, doing so consume significant computing resources and may not be supportable in manufacturing environment 460 in the future.

Figure 4D:
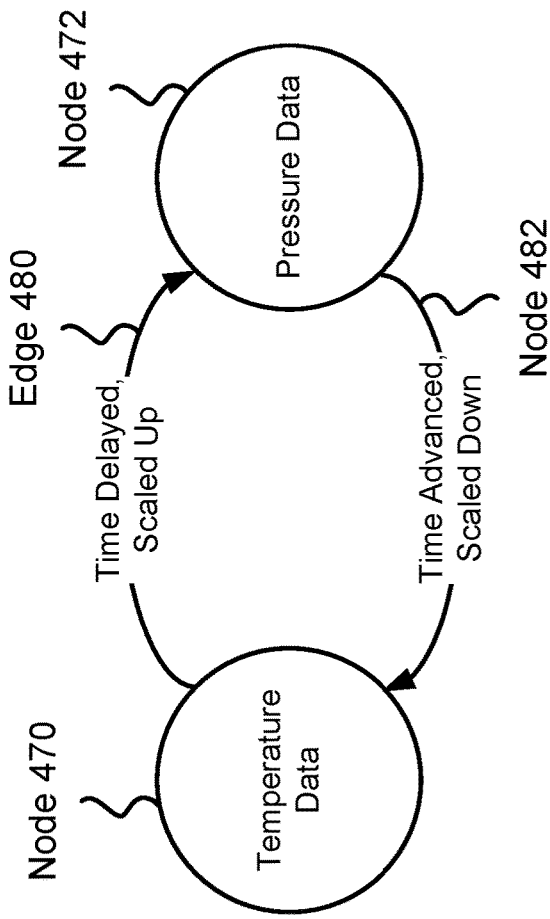
FIG. 4D show a diagram illustrating a causal graph in accordance with an embodiment.

Turning to FIG. 4B, to reduce the quantity of transmitted data, variance manager 404 obtains a portion of aggregated data 402 to use as training data to train a feature relationship model. In this example, variance manager 404 uses the training data to obtain causal graph 406. Causal graph indicates that the temperature of the material may be deduced from the pressure with a reasonable degree of accuracy but that the pressure may not be accurately deduced from the temperature. Refer to FIG. 4D for additional details regarding causal graph 406.

Using the causal graph, variance manager 404 obtains a data reduction plan based on error thresholds corresponding to the low temperature sensitivity of the material (e.g., a high error threshold) and high sensitivity of the material to pressure (e.g., a low error threshold). The plan indicates that data regarding the temperature feature need not be provided to the aggregator so long as data regarding the pressure feature is available, that data may be batched for every 24-hour period, and that the pressure may be quantized to correspond to integer values of pounds per square inch (psi).

Variance manager 404 then configured data collector 450 to operate in accordance with the data reduction plan. For example, variance manager 404 may send data collector 450 a copy of the data reduction plan.

Turning to FIG. 4C, once configured data collector 450 begins to send reduced size data to data reduction manager 408 of data aggregator. The reduced size data may not include any temperature data, but may include measurements of the pressure of second process 454 (which may be represented as differentials/derived quantities if a twin inference model is being used in the system).

When data reduction manager 408 receives the reduced size data, causal graph 406 is used to reconstruct the temperature data from the pressure data using a relationship included in the graph. Data reduction manager 408 may also reconstruct the temperature data (or may otherwise use inferences if a twin inference model is included in the system) if necessary based on the content of reduced size data. The reconstructed data may reflect all of the process data of first process 452 and second process 454, within the acceptable error thresholds for downstream users of the process data, even though only a minority of the data collected by data collector 450 was provided to data aggregator 400 in full form.

Turning to FIG. 4D, a diagram of causal graph 406 in accordance with an embodiment is shown. Causal graph 406 may include two nodes 470, 472 reflecting the collected temperature data and pressure data. The two nodes 470, 472 may be connected by edges 480, 482. The edges 480, 482 may reflect the relationship between these features.

Edge 480 indicates that the pressure data is delayed in time from the temperature data, and scaled up in value. In other words, the temperature data may only be usable to identify past values of the pressure data. Thus, the temperature data may not be readily used to reconstruct the current pressure data. Accordingly, the pressure data may have a low reconstructability.

In contrast, edge 482 indicates that the temperature data is advanced in time from the pressure data, and scaled down in value. In other words, past values of the temperature data may be usable to identify the current value of the temperature data. Thus, the pressure data may be readily used to reconstruct the current temperature data. Accordingly, the pressure data may have a high reconstructability.

Consequently, as discussed with respect to FIGS. 4A-4C, the pressure data is provided by the collector to the aggregator, while the temperature data is not thereby conserving computing resources of the system while ensuring that the aggregator has access to the aggregated data that it needs to manage the operation of manufacturing environment 460.

Figure 5:
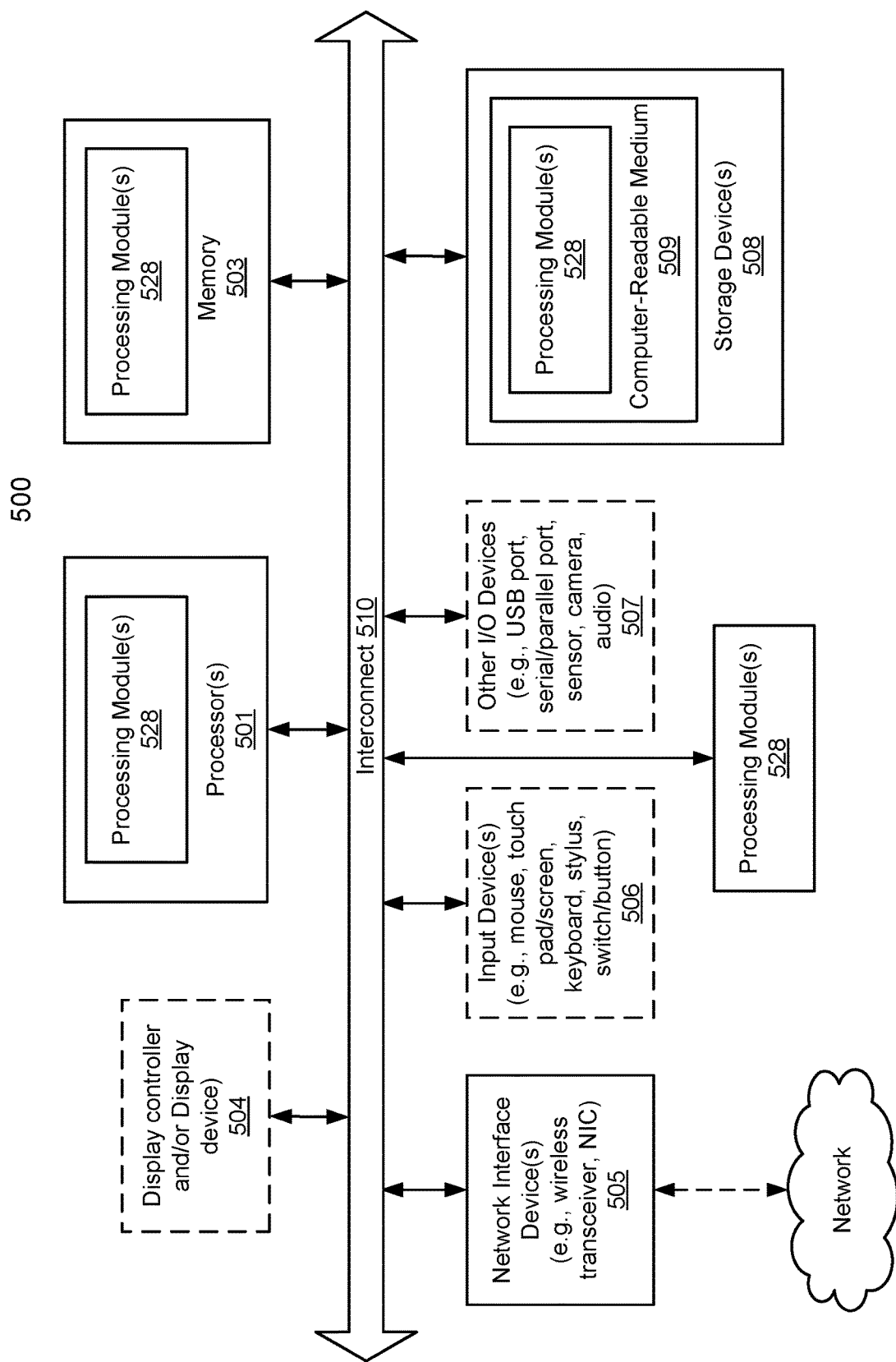
FIG. 5 shows a block diagram illustrating a data processing system in accordance with an embodiment.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed system where data is collected in a data aggregator of the distributed system and from a data collector of the distributed system that is operably connected to the data aggregator via a communication system, the method comprising:

obtaining, by the data aggregator, a data set for the data collector;

obtaining, by the data aggregator and using the data set, a feature relationship model comprising causal relationships between features of the data set;

selecting, by the data aggregator and using the feature relationship model, a data reduction plan based on acceptable error thresholds associated with the features;

configuring, by the data aggregator, the data collector to send reduced size data based on the data reduction plan;

obtaining, by the data aggregator, reduced size data from the configured data collector; and reconstructing, by the data aggregator, data upon which the reduced size data is based using the feature relationship model.

2. The method of claim 1, wherein the feature relationship model comprises a causal graph.

3. The method of claim 2, wherein the causal graph comprises nodes corresponding to the features of the data set and edges interconnecting the nodes.

4. The method of claim 3, wherein the edges indicate the causal relationships, the causal relationships indicating how different features of the features may be obtained using other features of the features.

5. The method of claim 1, wherein the data reduction plan indicates:

a first subset of the features that are to be indicated by the reduced size data and a second subset of the features that are not to be indicated by the reduced size data;

a quantization level for the first subset of the features; and a window duration that defines when the reduced size data is to be provided by the configured data collector to the data aggregator.

6. The method of claim 5, wherein the reduced size data comprises:

representations of the first subset of the features for a period of time defined by the window duration, the representations excluding portions of respective features based on a corresponding acceptable error threshold of the acceptable error thresholds.

7. The method of claim 6, further comprising:

providing the configured data collector with a copy of the feature relationship model; and initiating refinement of the data reduction plan by the configured data collector using the feature relationship model and measurements obtained by the configured data collector during the window duration, at least one of the representations represents a feature of the second subset of the features.

8. The method of claim 7, wherein the data reduction plan is refined sequentially for data corresponding to respective window durations.

9. The method of claim 1, wherein the data reduction plan is obtained using a genetic algorithm and an objective function based on:

quantization of the features of the data set;

predictability of the features of the data set with the feature relationship model;

reconstructability of the features of the data set using twin inference models hosted by the configured data collector and the data aggregator; and computing resource costs for transmitting the features of the data set from the configured data collector to the data aggregator.

10. The method of claim 1, wherein the configured data collector is operably connected to the data aggregator by the communication system.

11. A non-transitory machine-readable medium having instructions stored therein, which when executed by a processor, cause the processor to perform operations for managing data collection in a distributed system where data is collected in a data aggregator of the distributed system and from a data collector of the distributed system that is operably connected to the data aggregator via a communication system, the operations comprising:
- obtaining, by the data aggregator, a data set for the data collector;
- obtaining, by the data aggregator and using the data set, a feature relationship model comprising causal relationships between features of the data set;
- selecting, by the data aggregator and using the feature relationship model, a data reduction plan based on acceptable error thresholds associated with the features;
- configuring, by the data aggregator, the data collector to send reduced size data based on the data reduction plan;
- obtaining, by the data aggregator, reduced size data from the configured data collector; and
- reconstructing, by the data aggregator, data upon which the reduced size data is based using the feature relationship model.

12. The non-transitory machine-readable medium of claim 11, wherein the feature relationship model comprises a causal graph.

13. The non-transitory machine-readable medium of claim 12, wherein the causal graph comprises nodes corresponding to the features of the data set and edges interconnecting the nodes.

14. The non-transitory machine-readable medium of claim 13, wherein the edges indicate the causal relationships, the causal relationships indicating how different features of the features may be obtained using other features of the features.

15. The non-transitory machine-readable medium of claim 11, wherein the data reduction plan indicates:
- a first subset of the features that are to be indicated by the reduced size data and a second subset of the features that are not to be indicated by the reduced size data;
- a quantization level for the first subset of the features; and
- a window duration that defines when the reduced size data is to be provided by the configured data collector to the data aggregator.

16. A data aggregator, comprising:
- a hardware processor; and
- a memory coupled to the hardware processor to store instructions, which when executed by the hardware processor, cause the hardware processor to perform operations for managing data collection in a distributed system where data is collected in a data aggregator of the distributed system and from a data collector of the distributed system that is operably connected to the data aggregator via a communication system, the operations comprising:
  - obtaining, by the data aggregator, a data set for the data collector;
  - obtaining, by the data aggregator and using the data set, a feature relationship model comprising causal relationships between features of the data set;
  - selecting, by the data aggregator and using the feature relationship model, a data reduction plan based on acceptable error thresholds associated with the features;
  - configuring, by the data aggregator, the data collector to send reduced size data based on the data reduction plan;
  - obtaining, by the data aggregator, reduced size data from the configured data collector; and
  - reconstructing, by the data aggregator, data upon which the reduced size data is based using the feature relationship model.

17. The data aggregator of claim 16, wherein the feature relationship model comprises a causal graph.

18. The data aggregator of claim 17, wherein the causal graph comprises nodes corresponding to the features of the data set and edges interconnecting the nodes.

19. The data aggregator of claim 18, wherein the edges indicate the causal relationships, the causal relationships indicating how different features of the features may be obtained using other features of the features.

20. The data aggregator of claim 16, wherein the data reduction plan indicates:
- a first subset of the features that are to be indicated by the reduced size data and a second subset of the features that are not to be indicated by the reduced size data;
- a quantization level for the first subset of the features; and
- a window duration that defines when the reduced size data is to be provided by the configured data collector to the data aggregator.

\* \* \* \* \*